US012809713B2

(12) United States Patent
Atkinson et al.

(10) Patent No.: US 12,809,713 B2
(45) Date of Patent: Nov. 24, 2026

(54) SYSTEM AND METHOD FOR MANAGING PROCESSES PERFORMED BY HOST DEVICES USING A MANAGEMENT CONTROLLER

(71) Applicant: Dell Products L.P., Round Rock, TX (US)

(72) Inventors: Christopher Bauer Atkinson, Woodstock, GA (US); Vinay Sawal, Fremont, CA (US); Jason David Shaw, Georgetown, TX (US); Sudhir Vittal Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/497,484

(22) Filed: Oct. 30, 2023

(65) Prior Publication Data

US 2025/0138935 A1 May 1, 2025

(51) Int. Cl.

*G06F 11/07* (2006.01)
*G06F 11/30* (2006.01)
*G06F 11/32* (2006.01)

(52) U.S. Cl.

CPC ...... *G06F 11/0793* (2013.01); *G06F 11/3072* (2013.01); *G06F 11/327* (2013.01)

(58) Field of Classification Search

CPC . G06F 11/0793; G06F 11/3072; G06F 11/327
See application file for complete search history.

(56) References Cited

U.S. PATENT DOCUMENTS

| | | | | |
|---|---|---|---|---|
| 8,046,206 | B1 | 10/2011 | Hood, III et al. | |
| 10,769,335 | B1 | 9/2020 | Sareen et al. | |
| 11,159,609 | B2 | 10/2021 | McGrath et al. | |
| 11,200,246 | B2 | 12/2021 | Kharisma et al. | |
| 11,652,872 | B1 | 5/2023 | Parla et al. | |
| 12,124,835 | B2 | 10/2024 | Gonzalez | |
| 2008/0065755 | A1 | 3/2008 | Caspi | |
| 2010/0192218 | A1 * | 7/2010 | Shah | H04L 69/22 726/13 |
| 2011/0082670 | A1 | 4/2011 | McAuley | |

(Continued)

OTHER PUBLICATIONS

McCreesh, Ciaran, et al. "When subgraph isomorphism is really hard, and why this matters for graph databases," Journal of Artificial Intelligence Research 61 (2018): 723-759 (37 Pages).

(Continued)

*Primary Examiner* — Michael Maskulinski
*Assistant Examiner* — Mathew Donald Gustafson
(74) *Attorney, Agent, or Firm* — WOMBLE BOND DICKINSON (US) LLP

(57) ABSTRACT

Methods and systems for managing processes performed by a host device are disclosed. To manage the processes performed by the host device, the actual state of operation of the host device performing the process may be identified. To identify the actual state of operation, out-of-band components of the host device such as a management controller may obtain information presented by a graphical user interface managed by a process performed by the host device. The information may be used to infer the actual operating state of the host device. By doing so, the actual operating state may be used to manage the operation of the host device.

20 Claims, 7 Drawing Sheets

(56) References Cited

U.S. PATENT DOCUMENTS

| | | | | |
|---|---|---|---|---|
| 2011/0321033 | A1 | 12/2011 | Kelkar | |
| 2012/0158890 | A1* | 6/2012 | Jreij | G06F 11/3058 713/1 |
| 2016/0103673 | A1 | 4/2016 | Curran | |
| 2019/0044830 | A1 | 2/2019 | Kersch | |
| 2019/0354438 | A1 | 11/2019 | Mohanta | |
| 2019/0370778 | A1 | 12/2019 | Lerch | |
| 2020/0334025 | A1 | 10/2020 | Wang | |
| 2020/0348984 | A1 | 11/2020 | Giannetti | |
| 2021/0019135 | A1 | 1/2021 | Hwang | |
| 2021/0026707 | A1 | 1/2021 | Rosenberg | |
| 2021/0034350 | A1 | 2/2021 | Chen | |
| 2021/0081294 | A1* | 3/2021 | Golubev | G06F 11/3089 |
| 2021/0117548 | A1 | 4/2021 | Gokhman | |
| 2021/0319360 | A1 | 10/2021 | Vishnoi | |
| 2021/0334378 | A1 | 10/2021 | Kennedy | |
| 2021/0382798 | A1 | 12/2021 | Ganesan | |
| 2022/0206877 | A1 | 6/2022 | Sohail | |
| 2022/0327405 | A1 | 10/2022 | Ngo | |
| 2022/0398105 | A1* | 12/2022 | Lambert | G06F 1/206 |
| 2023/0062114 | A1 | 3/2023 | Rout | |
| 2023/0336340 | A1 | 10/2023 | Polleri | |
| 2024/0037368 | A1* | 2/2024 | Arora | G06F 11/0736 |
| 2024/0095494 | A1 | 3/2024 | Namiki | |
| 2024/0201767 | A1 | 6/2024 | Boyd | |

OTHER PUBLICATIONS

Kusari, Arpan, and Wenbo Sun. “Efficient Subgraph Isomorphism using Graph Topology,” arXiv preprint arXiv:2209.09090 (2022) (20 Pages).

Ronaghan, Stacy, “Machine Learning: Trying to discover structure in your data,” Medium, Jul. 31, 2018, Web Page <https://srnghn.medium.com/machine-learning-trying-to-discover-structure-in-your-data-2fbbc4f819ae> accessed on Jun. 22, 2023 (14 Pages).

Eliaçk, Eray, “Techniques to utilize data profiling for data quality evaluation,” Big Data, Data Science, Data Science 101, Apr. 8, 2022, Web Page <https://dataconomy.com/2022/04/08/what-is-data-profiling/> accessed on Jun. 22, 2023 (11 Pages).

Jaimovitch-López, Gonzalo, et al. “Can language models automate data wrangling?” Machine Learning 112.6 (2023): 2053-2082 (30 Pages).

* cited by examiner

SYSTEM AND METHOD FOR MANAGING PROCESSES PERFORMED BY HOST DEVICES USING A MANAGEMENT CONTROLLER

FIELD

Embodiments disclosed herein relate generally to process management services. More particularly, embodiments disclosed herein relate to systems and methods for managing a process performed by a host device using a management controller of the host device.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
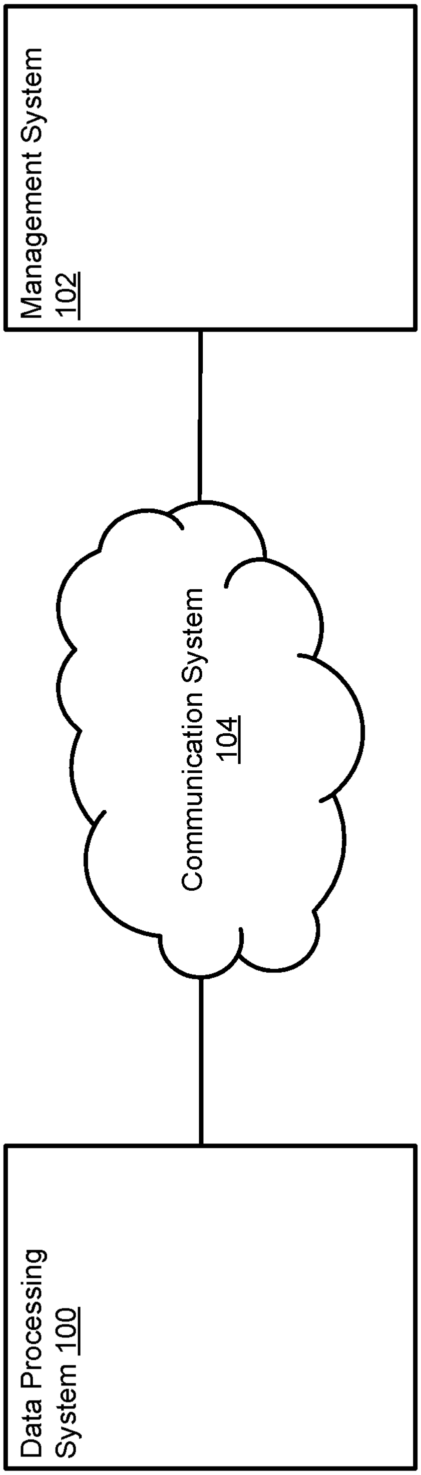
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing, at least in part, a process performed by a host device (e.g., a data processing system). To manage the process being performed, the system may include any number of data processing systems. A data processing system may include in-band components (e.g., processors, memory modules, storage devices, etc.) to perform the process in order for the data processing system to provide the computer-implemented services to consumers. However, the in-band components may encounter issues when performing the process which may affect completion of the process. Prior to deployment of an operating system (e.g., management software), the data processing system may be unable to communicate information regarding the current state of the process with external devices and/or a limited amount of information regarding the performance of the process may only be provided via select interfaces (e.g., graphical user interfaces). Thus, an individual may need to be local to the data processing system to obtain the limited amount of information via viewing the graphical user interface. However, the limited available information regarding the performance of the process may be insufficient to diagnose whether the process is progressing as expected (e.g., performing nominally) or unexpectedly (e.g., performing abnormally). Consequently, the operating state of the process during a failure may be undiagnosed which may lead to ineffective use of the hardware resources of the data processing system and failure to complete the process may occur.

In order to manage performance of the process, the system may include a management controller operably connected to the in-band components of the data processing system. The management controller may obtain a screenshot of a graphical user interface of the data processing system and utilize the screenshot to identify the status of the process while the process is being performed by the in-band components. The data processing system may provide the identified status of the progression of the process to an external operating system using the management controller. Based on the identified status of the progression of the process received from the management controller, an individual operating the external device may manage progression of the process remotely (e.g., as opposed to identifying and/or managing performance of the process by interacting directly with the data processing system using a Keyboard Video Mouse (KVM) session).

In an embodiment, a method for managing a process performed by a host device is provided. The method may include obtaining, by a management controller of the host device, a screenshot of a graphical user interface displayed on a display of the host device, the screenshot being obtained while the host device is performing the process, the process only providing information regarding progress of the process via the graphical user interface, and the process only being locally manageable using hardware resources of the host device; initiating, by the management controller and using the screenshot, identification of whether the process is progressing as expected for an instance of the process using a decision model; in a first instance of the identification where the process is not progressing as expected: performing an action set to manage progression of the process.

The decision model may be an inference model, the inference model may be trained to generate inferences indicating an expected progression status of the process, the expected progression status may indicate whether progression of the process is nominal, and a progress status of the process may indicate how much of the process has been completed.

Initiating identification of whether the process is progressing may include: obtaining an inference for the process using: the inference model; and the screenshot, the inference may indicate whether the process is progressing as expected for the instance of the process using the decision model.

Initiating identification of whether the process is progressing may further include: obtaining telemetry data for the hardware resources, the telemetry data may include measurements of characteristics of the hardware resources while the host device is performing the process, and the inference may be also obtained using the telemetry data.

Initiating identification of whether the process is progressing may further include: obtaining hardware data for the hardware resources, the hardware data may specify the hardware resources that are contributing to performance of the process, the inference may be also obtained using the hardware data.

Obtaining the inference may include ingesting the screenshot, the telemetry data, and the hardware data into the inference model, the inference model may generate the inference based on the screenshot, the telemetry data, and the hardware data.

The method may further include: identifying areas of interest in the screenshot; segmenting the screenshot into segments to obtain screenshot segments; and classifying the screenshot segments based on the areas of interest in the screenshot to obtain screenshot segment classifications corresponding to the screenshot segments.

Each of the areas of interest in the screenshot may define a group of pixels of the screenshot including informational content useable to infer the information regarding the progress of the process.

Performing the action set may include: obtaining, using the identification, management actions for the management controller, the management actions may be actions performable by the management controller to modify operation of the hardware resources; and performing, by the management controller, the management actions.

The method may further include: in a second instance of the identification where the process may be progressing as expected: providing a message via the management controller to an external device indicating the progression of the process.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer implemented services including database services, instant messaging services, and/or other types of computer implemented services.

To provide the computer implemented services, the system may include, for example, data processing system 100. Data processing system 100 may provide the computer implemented services.

As part of and/or to prepare to provide the computer implemented services, data processing system 100 may perform various processes such as startup processes, software installation processes, and/or other types of processes. These processes may be performed by in-band components of data processing systems such as, for example, processors, memory modules, storage devices, etc.

When performing these processes, for example, (i) the in-band components may be unable to perform other processes, (ii) information regarding the processes being performed may only be available via select interfaces (e.g., graphical user interfaces), (iii) only a limited selection of information regarding the performance of the processes may be available via the select interfaces (e.g., the graphical user interfaces may only include a progress status bar), (iv) the processes may not include general management interfaces through which performance of the processes may be managed, information regarding completion of the processes may be obtained, errors or undesired activity due to the processes may be tracked, etc., and/or (v) other types of limitations on the utility of data processing system 100 may be caused the performance of the processes.

For example, consider a scenario where a data processing system lacks management software such as an operating system and an installation for the operating system is initiated. The installer for the operating system may lack management interfaces, and information regarding the installation process may only be provided through a graphical user interface. Further, the graphical user interface may only provide a limited amount of information regarding the installation. Thus, when such processes are performed by data processing system 100, a person may need to be local to the data processing system to view the graphical user interface to understand the state of the installation process.

However, even if a person is present and able to view the graphical user interface, the limited available information may be insufficient for the person to diagnose whether the process is being performed nominally (e.g., as expected for the type of the process) or abnormally (e.g., stalled, failed, etc.). Consequently, when such processes are performed, they may be performed abnormally without the abnormality being apparent to administrators tasked with managing the data processing system.

Thus, even when informed using available interfaces, administrators may be unable to diagnose the operating states of data processing systems perform such processes. For example, while performing processes as discussed above, the data processing system may enter an undesired operating state (e.g., a frozen installation state, a failed installation state, frozen startup state, a failed startup state, etc.) without the change in state being detected.

In general, embodiments disclosed herein may provide methods, systems, and/or devices for managing processes performed by data processing system. To manage the processes performed by the data processing system, the actual state of operation of the data processing system may be identified. To identify the actual state of the data processing system, out-of-band components of a data processing system such as a management controller may obtain information presented by a graphical user interface managed by a process performed by the data processing system. The information may be used (in isolation and/or combination with other information) to infer the actual operating state of the data processing system. By doing so, the actual operating state may be used to manage the operation of the data processing system.

To provide the above noted functionality, the system may include data processing system 100, management system 102, and communication system 104. Each of these components is discussed below.

Data processing system 100 may provide all, or a portion, of the computer-implemented services. For example, data processing system 100 may provide computer-implemented services to users of data processing system 100 and/or other computing devices operably connected to data processing system 100.

Figure 1B:
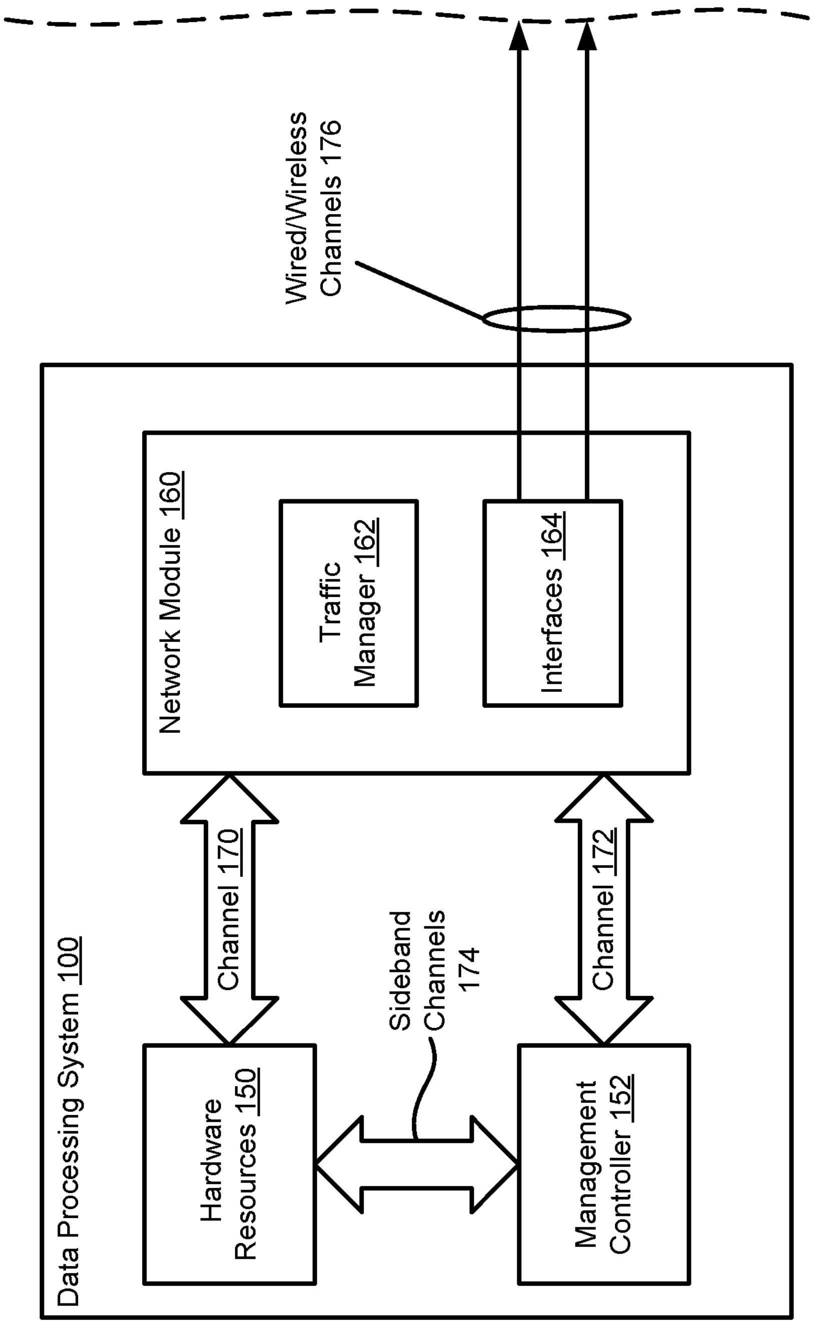
FIG. 1B shows a second block diagram illustrating data processing system 100 of FIG. 1A in accordance with an embodiment.

To facilitate the computer implemented services, data processing system 100 may participate in process management services provided in cooperation with management system 102. To participate in the process management services, data processing system 100 (*i*) obtain a screenshot of a graphical user interface displayed on a display of a host device, (ii) obtain a decision model (e.g., inference model trained to generate inferences indicating an expected progression status of processes), (iii) initiate, using at least the screenshot, identification of whether a process performed by data processing system 100 is progressing as expected for an instance of the process (e.g., by identifying an operating state of the data processing system), and/or (iv) facilitate management of progression of the process being performed by the host device based on the identified operating state of the data processing system. Refer to FIG. 1B for additional details regarding data processing system 100.

Management system 102 may also participate in the process management services. When participating in the process management services, management system 102 may (i) obtain the screen shot and/or other information regarding operation of data processing system 100 from data processing system 100, (ii) identify the operating state of data processing system 100 based on the obtained information from data processing system 100, (iii) perform an action set to manage progression of the process based on the identified operating state of data processing system 100, and/or (iv) perform other processes to facilitate management of data processing system 100.

When providing the functionalities, data processing system 100 and/or management system 102 (and/or components thereof) may perform all, or a portion, of the methods and/or actions shown in FIGS. 2A-3B.

Data processing system 100 and/or management system 102 (and/or components thereof) may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 104. In an embodiment, communication system 104 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Turning to FIG. 1B, a diagram illustrating data processing system 100 in accordance with an embodiment is shown. Data processing system 100 may be similar to any of the data processing systems shown in FIG. 1B.

To provide computer implemented services, data processing system 100 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100) to another device via any number of intermediate networks (e.g., via wired/wireless channels 176 that are part of the networks).

To reduce the likelihood of the applications and/or other in-band entities from being indirectly compromised, data processing system 100 may include management controller 152 and network module 160. Each of these components of data processing system 100 is discussed below.

Management controller 152 may be implemented, for example, using a system on a chip or other type of independently operating computing device (e.g., independent from the in-band components, such as hardware resources 150, of a host data processing system 100). Management controller 152 may provide various management functionalities for data processing system 100. For example, management controller 152 may monitor various ongoing processes performed by the in-band component, may manage power distribution, thermal management, and/or other functions of data processing system 100.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

For example, to provide information regarding the status of processes performed by hardware resources 150, management controller 152 may enable information from hardware resources 150 to be provided to other devices without traversing the network stack and/or when an operating system of the data processing system 100 has not been installed. To do so, management controller 152 may obtain information regarding the status of hardware resources 150 via sideband channels 174. Management controller 152 may then, for example, utilize the information to obtain an inference (e.g., using an inference model) indicating whether the process is progressing according to an expected progression schedule for the respective process. Thus, management controller 152 may provide the status of the process being performed by hardware resources 150 to external devices without compromising the application and/or without installation of an operating system by data processing system 100.

Management controller 152 may be operably connected to communication components of data processing system 100 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100 may include network module 160. Network module 160 may provide communication services for in-band components and out-of-band components (e.g., management controller 152) of data processing system 100. To do so, network module 160 may include traffic manager 162 and interfaces 164.

Traffic manager 162 may include functionality to (i) discriminate traffic directed to various network endpoints advertised by data processing system 100, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These component may support any number of wired/wireless channels 176.

Thus, from the perspective of an external device, the in-band components and out-of-band components of data processing system 100 may appear to be two independent network entities, that may independently addressable, and otherwise unrelated to one another.

Figure 2A:
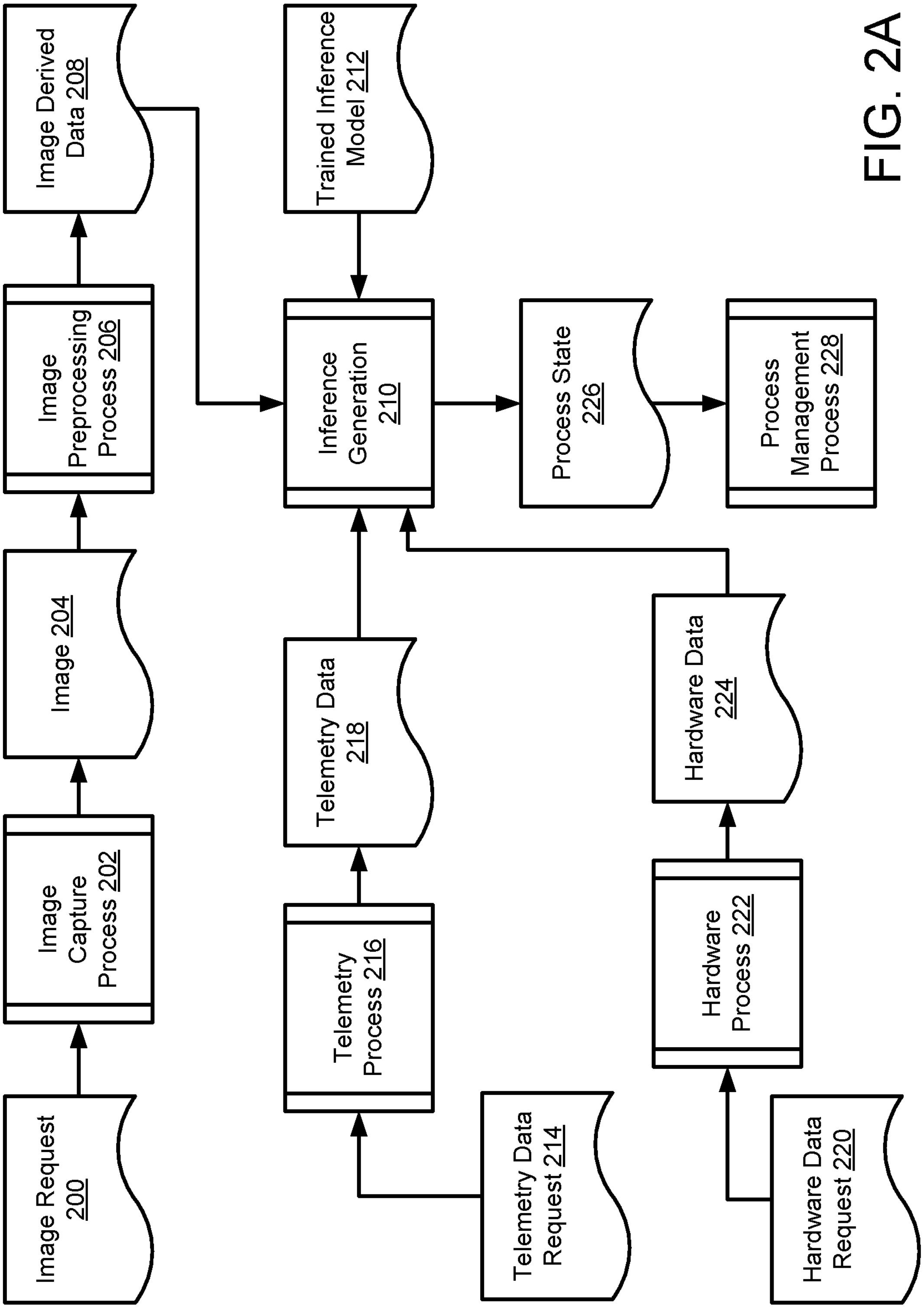
FIG. 2A shows a data flow diagram illustrating a first data flow in accordance with an embodiment.
Figure 2B:
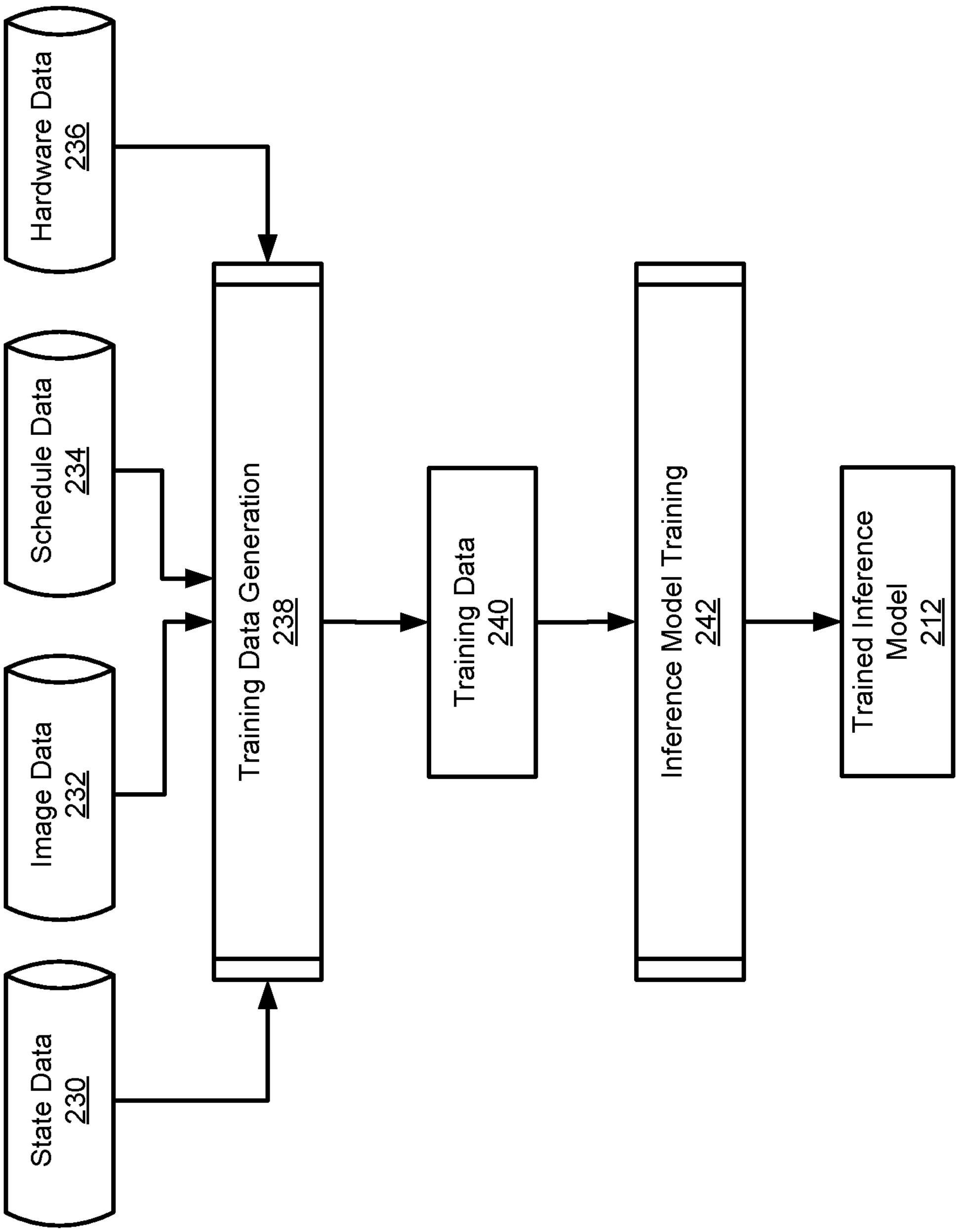
FIG. 2B shows a data flow diagram showing inference model training in accordance with an embodiment.

To further clarify embodiments disclosed herein, data flow diagrams in accordance with an embodiment are shown in FIGS. 2A-2B. The data flow diagrams may illustrate how data is obtained and used within the system of FIGS. 1A-1B. In these diagrams, flows of data and processing of data are illustrated using different sets of shapes. A first set of shapes (e.g., 200, 214, etc.) is used to represent data structures, a second set of shapes (e.g., 202, 206, etc.) is used to represent processes performed using and/or that generate data, and a third set of shapes (e.g., 220, 226, etc.) is used to represent large scale data structures such as databases.

Turning to FIG. 2A, a first data flow diagram illustrating data flows, data processing, and/or other operations that may be performed by the system of FIGS. 1A-1B in accordance with an embodiment is shown. The data flows, data processing, and/or other operations may be performed in identifying the actual operating state of a data processing system (e.g., data processing system 100) in order to manage processes being performed by the data processing system.

In order to manage processes being performed by the data processing system (e.g., 100), management controller 152 (e.g., an out-of-band component of data processing system 100) may obtain image derived data 208, telemetry data 218, and hardware data 224 for the data processing system, and initiate obtaining of an inferred operating state of the data processing system during performance of processes by the data processing system. For example, the aforementioned data may be collected when the data processing system is operating in a manner where it may not report its operating state to other entities. By doing so, the inferred operating state (e.g., process state 226) may be used to manage the operation of the data processing system.

To obtain the inferred operating state of the data processing system, inference generation process 210 may be performed to obtain inferences (e.g., process state 226). To obtain the inferences, an inference model (e.g., trained inference model 212) may be obtained. Inferences (e.g., indicating an expected progression status of processes being performed by in-band components of data processing system 100) may be obtained using trained inference model 212. Trained inference model 212 may be trained to generate inferences (e.g., as part of inference generation 210) indicating the progression status (e.g., process state 226) of the process being performed by the hardware resources of the data processing system (e.g., 100 shown in FIG. 1B). For example, the inferences (e.g., generated by trained inference model 212) may indicate whether the progression of the process is performing nominally (e.g., as expected for the type of process) at a specific point in time. A process that has stalled when compared to typical performances of the process may not be progressing nominally, while a process that has reached various checkpoints throughout the process in durations of time that are typical for the type of the process and the hardware resources for use in the process may be progressing nominally. Process state 226 may indicate nominal or not nominal progression of the process.

Trained inference model 212 may be obtained using a variety of processes (e.g., generation, acquisition from another entity, etc.). For example, management controller 152 (shown in FIG. 1B) may obtain trained inference model 212 from an external entity through a communication system (e.g., communication system 104). In another example, trained inference model 212 may be generated using a set of training data (e.g., training data 240 shown in FIG. 2B). Refer to FIG. 2B for additional details regarding obtaining an inference model.

Prior to obtaining an inference (e.g., process state 226), image derived data 208, telemetry data 218, and/or hardware data 224 may be obtained and which may serve as input to the trained inference model 212 during inference generation process 210. Image derived data 208, telemetry data 218, and/or hardware data 224 may include different types of data relating to in-band components of the data processing system (e.g., 100; FIG. 1B). To obtain the different types of data relating to in-band components, various data collection processes (e.g., telemetry process 216, hardware process 222, image preprocessing process 206, image capture process 202, and/or other processes not explicitly shown in FIG. 2A) may be performed.

To obtain telemetry data 218, telemetry process 216 may be performed. To perform telemetry process 216, telemetry data request 214 may be obtained, for example, from a management controller (e.g., 152; FIG. 1B) to initiate collection of telemetry data (e.g., telemetry data 218) for the in-band components. For example, during telemetry data process 216, information regarding operation of a processor (e.g., temperature data, processing speed, etc.) while the process is being performed may be collected and transmitted to management controller 152 (shown in FIG. 1B). Telemetry data 218 may include any type of information usable to identify performance related issues, operating conditions, and/or other types of information for in-band components of a data processing system (e.g., data processing system 100).

To obtain hardware data 224, hardware process 222 may be performed. To perform hardware process 222, hardware data request 220 may be obtained, for example, from a management controller (e.g., 152; FIG. 1B) to initiate collection of hardware data (e.g., 224) for the in-band components. During hardware process 222, information relating to the hardware resources that are contributing to performance of the process may be collected and transmitted to management controller 152 (shown in FIG. 1B). For example, during hardware process 222, informational data (e.g., type, size, quantity, etc.) for hardware components (e.g., processors, memory modules, storage devices, etc.) of data management system 100 may be collected and transmitted to management controller 152 (shown in FIG. 1B). Hardware data 224 may include any type of information usable to identify the hardware resources of the data processing system (e.g., 100 shown in FIG. 1B) that may affect the performance of the processes being performed.

To obtain image derived data (e.g., 208), image preprocessing process 206 may be performed. During image preprocessing process 206, image 204 may be ingested and analyzed. The image (e.g., 204) may be used in various image processing processes to enhance the quality of the image, derive information from the image, and/or otherwise obtain information from image 204. Image preprocessing process 206 may include utilizing techniques (e.g., optical character recognition, textual information preprocessing, textual analysis using natural language processing, etc.) to extract visual features and detect objects or regions of interest (e.g., within image 204). For example, image preprocessing process 206 may include (i) identifying areas of interest in the screenshot (e.g., areas where graphical representations of progress are shown, areas where characters corresponding to words describing events/activities/etc. that occur during the process, etc.), (ii) segmenting the screenshot into segments to obtain screenshot segments, and/or (iii) extracting information from each screenshot segment by, for example, classifying the screenshot segments based on the areas of interest in the screenshot to obtain screenshot segment classifications corresponding to the screenshot segments. In some instances, the areas of interest in the screenshot (e.g., image 204) may define a group of pixels of the screenshot including informational content usable to infer the information (e.g., image derived data 208) regarding the progression of the process.

Image 204 may include a screenshot of the information regarding progress of the process displayed on a display of a graphical user interface of the data processing system. For example, image 204 may include a status bar and a percentage of the status bar being filled indicating the progress of the process being performed by data processing system 100.

To obtain the image (e.g., 204), image capture process 202 may be performed. Image capture process 202 may include receiving image request 200 to obtain a screenshot of the graphical user interface displayed on a display of the data management system. During image capture process 202, management controller (e.g., 152 shown in FIG. 1B) may communicate with the in-band components of the data management system in order to obtain a screenshot including the information regarding progress of the process being performed. For example, the management controller may read information from a graphics adapter or other type of hardware device that manages display of information on a display. The information may be kept, for example, in a frame buffer or other data storage structure that defines information for pixels in a display. Reading the frame buffer may allow the management controller to construct a screenshot of what would be displayed on a display.

After performing the various collection processes for the in-band components, the collected data (e.g., image derived data 208, telemetry data 218, and/or hardware data 224) may be used to infer the operating state of the data processing system.

To infer the operating state of the data processing system (e.g., process state 226), image derived data 208, telemetry data 218, and/or hardware data 224 may be used in inference generation process 210. During inference generation process 210, different types of data relating to in-band components may be ingested in an inference model (e.g., trained inference model 212). Inference generation process 210 may include ingesting telemetry data 218, hardware data 224, and/or image derived data 208 into trained inference model 212 to obtain an inferred operating state (e.g., process state 226) of the data processing system and which may be stored as process state 226. In other words, a prediction for the operating state of data processing system.

Process state 226 may indicate whether the process performed by the data management system (e.g., 100) is progressing as expected (e.g., process is being performed nominally for a process of the types of the process for the hardware resources of the system performing the process) or if the process is performing abnormally (e.g., stalled, failed, progressing slower than expected, etc.). Process state 226 may identify, for example, whether the operating state of the data processing system is aligned with the expectations (e.g., performance, timing, etc.) of a similar type of process being performed by data processing systems with similar hardware resources.

Once obtained, process state 226 may be used to manage the progression of the process being performed by the data management system. To manage the progression of the process, process management process 228 may be performed. During process management process 228, the inferred operating state may be provided to an external device to facilitate management of the progression of the process by an individual, may be used to automatically initiate activity to change the progression, and/or may be used as a basis for performing other types of actions for managing progression of the process. For example, management controller 152 may provide process state 226 to management system 102 (shown in FIG. 1A) to allow an individual (e.g., with access to and/or control over management system 102) to remotely manage operations of the data processing system.

For example, in a scenario in which process state 226 indicates that a process is being performed abnormally (e.g., stalled, failed, etc.), then various actions may be performed to modify operation of the data processing system by the management controller (e.g., 152) (e.g., as initiated by process management process 228). In this example, management controller 152 may communicate the abnormal progression status of the process (e.g., process state 226) to an external device operated by individual to facilitate management of actions in order to resolve the undesired operating state of the data processing system. The management controller may perform management actions indicated by an individual (e.g., via external operating system) to modify the operation of the hardware resources (e.g., hardware resources 150 shown in FIG. 1B) of the data processing system.

In this example, to perform the actions, management controller 152 may receive management actions (e.g., communicated by an external device using sideband channels 172 shown in FIG. 1B) to cancel the process being performed at that time and begin performing a new process. Management controller 152 may send instructions to the hardware resources (e.g., via sideband channels 174) to stop performing the process and begin performing a new process. By doing so, managing processing being performed by a data processing system may be performed remotely (e.g., in a remote location from the data processing system).

Continuing with the example, if process state 226 indicates that the processes are being performed nominally (e.g., as expected for the type of process), then process management process 228 may include providing a message (e.g., via management controller 152; FIG. 1B) to an external device indicating the progression of the process (e.g., that it is nominal). The message may include the information relating to the operating status of the in-band components such as image derived data 208, telemetry data 218, hardware data 224, and/or any other information collected by management controller 152 and/or other information that may be otherwise relevant to management of the process.

Thus, using the data flow illustrated in FIG. 2A, while operating, the system of FIGS. 1A and 1B may remotely manage operations of data processing system by inferring an operating state of the data processing system while the data processing system is unable or unwilling to report its operating state. As part of the process of inferring the operating state of the data processing system, inferences may be generated using a trained inference model (e.g., a trained neural network, decision tree, or other type of predictive data structure).

Turning to FIG. 2B, a second data flow diagram illustrating data flows, data processing, and/or other operations that may be performed by the system of FIGS. 1A-1B in accordance with an embodiment is shown. The data flows, data processing, and/or other operations may be performed in training machine learning models (or other types of inference models) to obtain trained inference models usable to perform, at least in part, the first data flow shown in FIG. 2A.

With reference to FIG. 2A, trained inference model 212 may be obtained and used as part of the first data flow. As part of the second data flow shown in FIG. 2B, trained inference model 212 may be obtained via generation. To obtain trained inference model 212 via generation, a neural network (or other inference model type) may be trained using, for example, supervised learning, self-supervised learning, semi-supervised learning, and/or unsupervised learning. For example, with supervised learning, some number of instances of processes being performed may be hand-labeled by a subject matter expert to obtain a training data set (e.g., training data 240). Once obtained, training data 240 may be used to train the neural network (e.g., to set the weights of neurons and/or other features of the neural network).

To obtain training data 240, training data generation process 238 may be performed. During training data generation process 238, information relating to progress of processes being performed (e.g., by hardware resources 150 shown in FIG. 1B) at different points in time may be obtained and subjected to any type of mathematical optimization techniques to identify a relationship between features of the process and a label (e.g., outcome, result, or other type of label ascribed to the features). For example, image data 232, schedule data 234, hardware data 236, and/or state data 230 may be obtained during performance of an instance of a process (e.g., by hardware resources of a data processing system) over a period of time.

To obtain image data 232, schedule data 234, and/or hardware data 236, an out-of-band component (e.g., a management controller) of the data processing system (e.g., performing the process) may communicate with in-band components of the data processing system.

Image data 232 may include a screenshot of a graphical user interface displayed on a display of a data processing system during performance of the process at a point in time. The screenshot may include information regarding progress of the process being shown on the display of the data processing system. For example, a management controller may communicate a request for data corresponding to information being shown on a display to the graphics adapter (e.g., and/or another type of hardware component that manages display of information on a display). For example, management controller 152 may read information relating to values of the pixels in the display (e.g., provided by the graphics adapter) and use the information to construct an image (e.g., screenshot) of what would be displayed on a display. The image data 232 may include a screenshot of any type of information regarding progress of the process being performed (e.g., which may be displayed on a display of the data processing system). For example, image data 232 may include a status bar and a percentage of the status bar being filled indicating the progression of the process at the point in time in which the information is obtained from the graphics adapter and/or another type of hardware device that manages the display of information on a display.

While described with respect to just image data 232, image derived data may also be used as a feature of the training data. Consequently, trained inference models may use image data and/or image derived data to predict process states.

Schedule data 234 may include information regarding a duration of time that has passed since the start of the process for the point in time at which the other data is being collected (e.g., image data 232, hardware data 236, etc.). For example, a management controller of the data processing system may obtain schedule data 234 at various points in time in which image data 232, and/or hardware data 236 is collected to be used in identifying a relationship between progression of the process being performed over a period of time. Schedule data 234 may be used to obtain an expected progression of the process within a time interval.

Hardware data 236 may include any information relating to the hardware resources that are contributing to the performance of a process and/or telemetry data (e.g., health related data) relating to the hardware resources of the data processing system. In some instances, a data processing system may include different hardware resources (e.g., processors, storage devices, etc.) that may contribute to performance of processes in different ways. For example, a data processing system with a high performance processor may perform processes at faster speeds than compared to a low performance processor. As such, the parameters of hardware resources contributing to performance of a process may be obtained and used during training data generation process to identify any variance of progression of processes based on hardware resources of the data processing system.

In addition, hardware data 236 may include information relating to the telemetry data of the hardware resources while performing a process at different points in time to identify a range of performance measurements for different instances of processes being performed. The telemetry data may include measurements of characteristics of the hardware resources of the data processing system. For example, hardware data 236 may include temperature data of a processor while performing a process (e.g., at a point in time). Hardware data 236 may be collected over a period of time while the data processing system is performing a process. Hardware data 236 may be used to identify a range of performance metrics that may indicate if any performance related issues for the hardware resources contribute to the progress of the process. For example, management controller may collect temperature data of the processor while performing a process (e.g., over a period of time) in both successful and unsuccessful installations of the process. In this instance, the temperature data of the processor may be used to define a temperature range of the processor to fall within in order to successfully complete installation of a process. Any temperature data identifying a temperature outside the temperature range may indicate an error or issue with performance of the processor.

State data 230 may be the progress state ascribed to the process corresponding to image data 232, schedule data 234, and hardware data. Thus, state data 230 may serve as a label with image data 232, schedule data 234, and hardware data being features for this label. State data 230 may be provided by a subject matter expert by reviewing the features and defining the label in terms of the features.

Once obtained, training data 240 may be obtained by associating image data 232, schedule data 234, and hardware data 236 as features with the corresponding label of state data.

Thus, training data generation process 238 may result in the generation of training data 240. Accordingly, an inference model may be trained using training data 240 (e.g., to set the weights of neurons and/or other features of the inference model) to predict whether a process is progressing as expected for the instance of the process being performed (e.g., nominally or abnormally).

To obtain trained inference model 212, inference model training process 242 may be performed. During inference model training process 242, training data 240 may be ingested into a machine learning model (e.g., a deep learning model or other type of model). Once ingested, the weights and structure of the machine learning model may be adapted (e.g., values for nodes of intermediate layers may be selected, connections may be pruned/added, etc.) to generate inferences based on image data 232, schedule data 234, hardware data 236, and/or state data 230 (e.g., and/or other training data, training data 240 may include any amount of training data; state data, image data, schedule data, and hardware data 236 may be one feature-label association of training data 240).

Trained inference model 212 may generate inferences indicating an expected progression status of a process (e.g., an inferred operating state of a device) being performed by a data processing system (e.g., while the data processing system is unable or unwilling to report its operating state) based on new instances of measure image data, schedule data, and hardware data (e.g., in aggregate "process data"). For example, trained inference model 212 may ingest process data relating to progress of a process at a point in time (e.g., obtained from in-band components of a data processing system), such as image derived data (e.g., 208 shown in FIG. 2A), telemetry data (e.g., 218 shown in FIG. 2A), and/or hardware data (e.g., 224 shown in FIG. 2A). Once ingested, trained inference model 212 may use the data to generate an inference indicating whether the progress of the process being performed is nominally (e.g., performing as expected for the instance of the process).

Accordingly, the obtained trained inference model 212 may be used, as part of the first data flow shown in FIG. 2A, to manage progression of the processes being performed by the data management system.

Figure 3A:
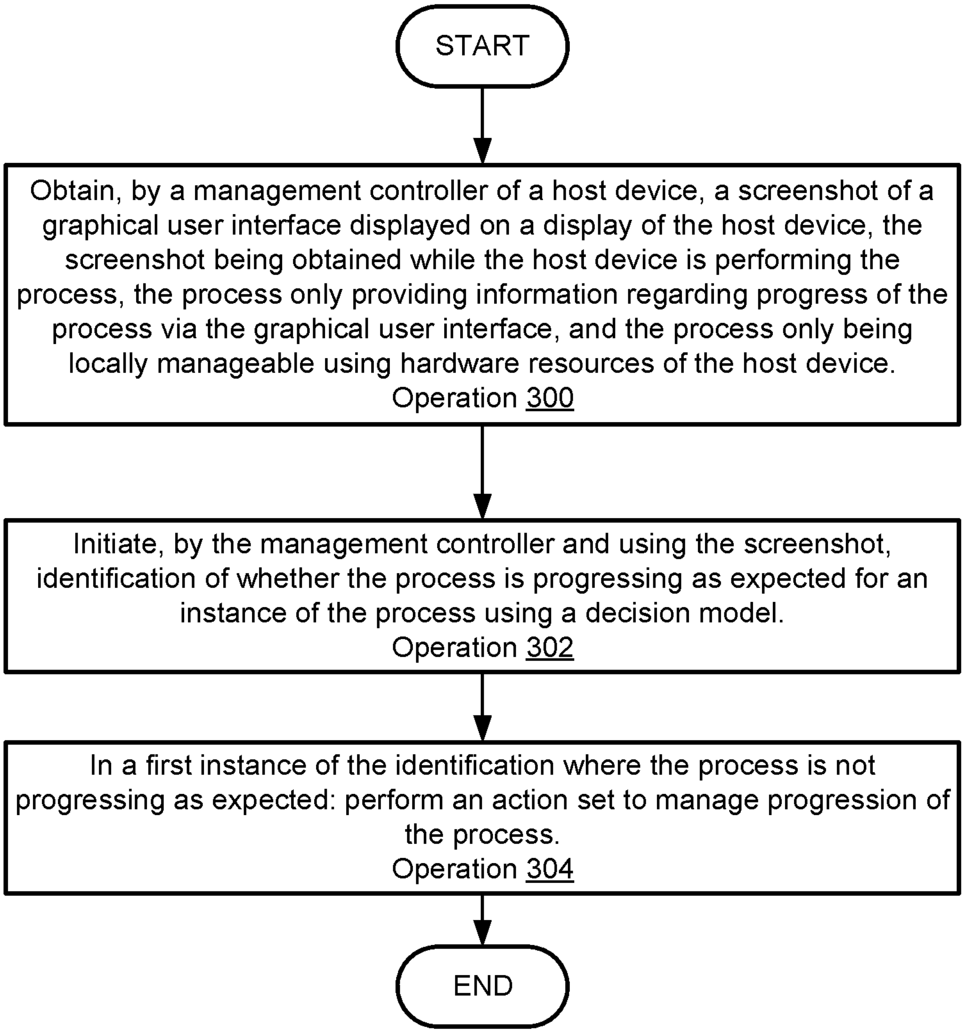
FIG. 3A-3B shows flow diagrams illustrating methods of managing a process performed by a host device in accordance with an embodiment.
Figure 3B:
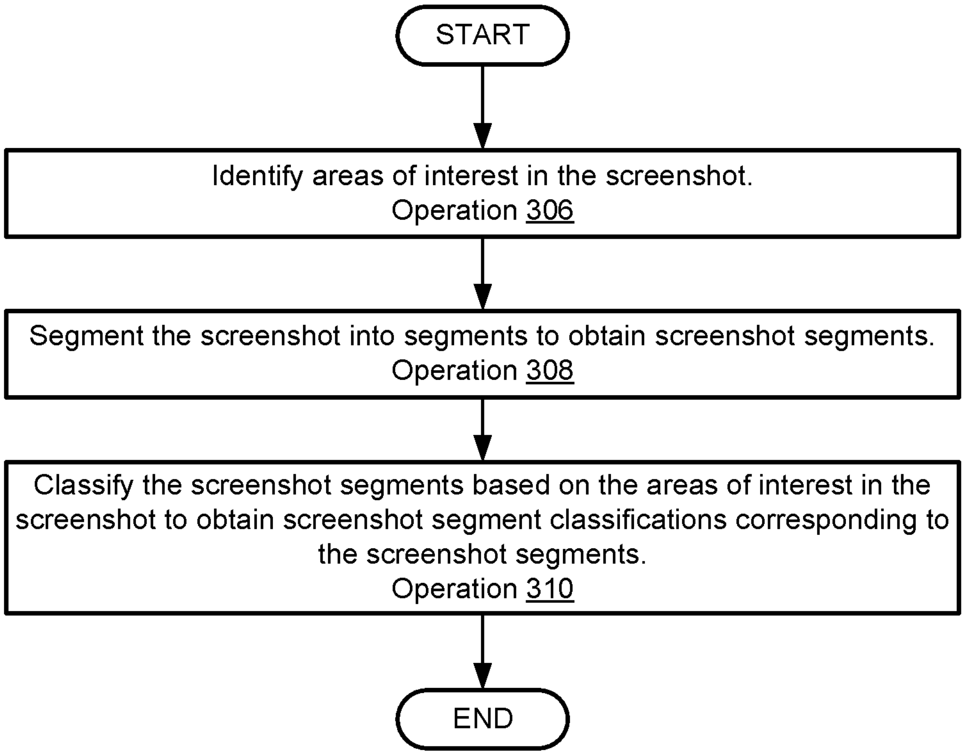

As discussed above, the components of FIGS. 1A-2B may perform various methods to provide process management services by identifying an inferred state of operation of the data processing system in order to manage operation of the data processing system. FIGS. 3A-3B illustrate methods that may be performed by the components of FIGS. 1A-2B. In the diagrams discussed below and shown in these figures, any of the operations may be repeated, performed in different orders, omitted, and/or performed in parallel with or a partially overlapping in time manner with other operations.

Turning to FIG. 3A, a flow diagram illustrating a method of managing a process performed by a host device in accordance with an embodiment is shown. The method may be performed, for example, by a data processing system, a management system, a communication system, a management controller, hardware resources, and/or other components illustrated in FIGS. 1A-2B.

Prior to operation 300, a data processing system may have obtained a trained inference model. The trained inference model may have been obtained through various processes such as generation, acquisition from external entity, and/or by any other method. The trained inference model may have been trained to generate inferences indicating an expected progression status (e.g., whether the progression of the process is performing as expected) of processes being performed by hardware resources of a data management system.

At operation 300, a screenshot of a graphical user interface displayed on a display of a host device may be obtained. The screenshot may be obtained by a management controller of the host device. The screenshot may be obtained while the host device is performing a process. The process may only provide information regarding progress of the process via the graphical user interface. The process may only be locally manageable using hardware resources of the host device. For example, when performing a process, in-band components of a host device may be only able to communicate information regarding the process being performed via select interfaces (e.g., graphical user interfaces) and only a limited selection of the information may be available via the select interfaces (e.g., the graphical user interfaces may only include a progress status bar).

The screenshot may be obtained by the management controller communicating with any of the in-band components of the host device to obtain the information regarding the progress of the process being performed by the host device. For example, the management controller may read information from a graphics adapter and/or another type of hardware component of the host device that manages display of information on a display of a graphical user interface of the host device. The information may be kept, for example, in a data storage structure (e.g., frame buffer) that defines information for pixels in a display and the management controller may read the information from the frame buffer in order to obtain a screenshot of the information being displayed on a display of the host device.

At operation 302, identification of whether the process is progressing as expected for an instance of the process using a decision model may be initiated by the management controller and using the screenshot. The decision model may be an inference model trained to generate inferences. The inferences may indicate an expected progression status of the process, the expected progression status may indicate whether progression of the process is nominal.

Identification of whether the process is progressing may be initiated by (i) obtaining telemetry data for the hardware resources, (ii) obtaining hardware data for the hardware resources, (iii) obtaining an inference for the process using the inference model (e.g., decision model), and/or (iv) performing any other methods. The inference may be obtained by ingesting the screenshot, the telemetry data, and the hardware data into the inference model.

At operation 304, in a first instance of the identification where the process is not progressing as expected: an action set to manage progression of the process may be performed. The action set to manage progression of the process may be performed by (i) obtaining, using the identification, management actions for the management controller, (ii) performing, by the management controller, the management actions, and/or (iii) performing any other methods. The management actions may be actions for the management controller to modify operation of the hardware resources. Obtaining the management actions may be performed by communicating the identification (e.g., the inferred operating state of the data processing system) to an external device operated by an individual thereby allowing the individual to facilitate management of actions (e.g., based on the identification of whether the progress of the process is performing nominally or abnormally).

For example, if the identification indicates the process is not processing as expected (e.g., performing abnormally), management controller 152 may communicate the abnormal progression statues of the process to an external device using communications channels (e.g., separate from in-band components). Then, management controller 152 may receive the management actions (via communication channel 172 shown in FIG. 1B) indicated by the individual operating the external device. Based on the management actions received from the external device, management controller 152 may perform the managements actions by communicating the actions to manage the operation of the process with the hardware resources of the data processing system.

The method may also include a second instance of the identification where the process is progressing as expected: provide a message, via the management controller, to an external device. The message may be provided to the external device by using communication channels (e.g., separate channel from the in-band components of the host device) between the management controller and the external device (e.g., channel 172 shown in FIG. 1B). The message may indicate the progression of the process including the information relating the operating status of the in-band components obtained by the management controller (e.g., image derived data 208, telemetry data 218, hardware data 224 shown in FIG. 2A), and or any other information that may be otherwise relevant to management of the process.

Turning to FIG. 3B, a flow diagram illustrating a method of obtaining screenshot segment classifications in accordance with an embodiment is shown. The method may be performed, for example, by a data processing system, a management system, a communication system, a management controller, hardware resources, other components illustrated in FIGS. 1A-2B, and/or other components not shown in FIGS. 1A-2B.

Prior to operation 302, the method may include additional imaging processes of the screenshot obtained (e.g., via operation 300). The additional image processing of the screenshot may include operations 306-310, described in detail below.

At operation 306, areas of interest in the screenshot may be identified. The areas of interest may be identified by (i)

reading them from storage (e.g., if they already exist) and/or (ii) through automated analysis of the screenshot. The automated analysis may be performed with an inference model (e.g., which may be treated as a subject matter expert) that may take the screenshot as input and output the areas of interest. Each of the areas of interest in the screenshot may define a group of pixels of the screenshot comprising informational content useable to infer the information regarding the progress of the process.

For example, in the context of a screenshot, the process may be an operating system of the data processing system. An inference model may be trained to identify information relating to the progress of processes being performed based on pixel information received from a graphics adapter and/or another hardware device that manages the display of a graphical user interface. In this example, the inference model may identify a status bar of the progress of the process being performed (e.g., area of interest). The inference model may provide the identified areas of interest (or the most critical areas of interest) for use in obtaining identification of whether the progress of the process is performing nominally.

At operation 308, the screenshot is segmented into segments to obtain screenshot segments. The screenshot segments may be portions of the screenshot. The screenshot segments may be similar or different amounts of the screenshot. For example, the screenshot may be segmented into segments by an inference model or another computer-implemented process.

At operation 310, the screenshot segments are classified based on the areas of interest in the screenshot to obtain screenshot segment classifications. The screenshot segments may be classified based on their membership in the areas of interest. A screenshot segment may be a member of an area of interest if the screenshot segment includes a portion of the screenshot that lies within a boundary that defines the area of interest. The areas of interest may be used to classify the screenshot segment into one of any number of groups. For example, the screenshot segments may be classified based on the type of data (e.g., statistical, status bar, etc.) included in each screenshot segments. The aforementioned process may be repeated for each screenshot segment to classify each of the screenshot segments.

The method may end following operation 310.

Using the methods illustrated in FIGS. 3A-3B, embodiments disclosed herein may facilitate management of a process being performed by a host device (e.g., data processing system). Managing a process performed by a host device may include using out-of-band components of the host device to obtain information presented by a graphical user interface managed by the process performed and inferring the actual operating state of the host device using the information.

Figure 4:
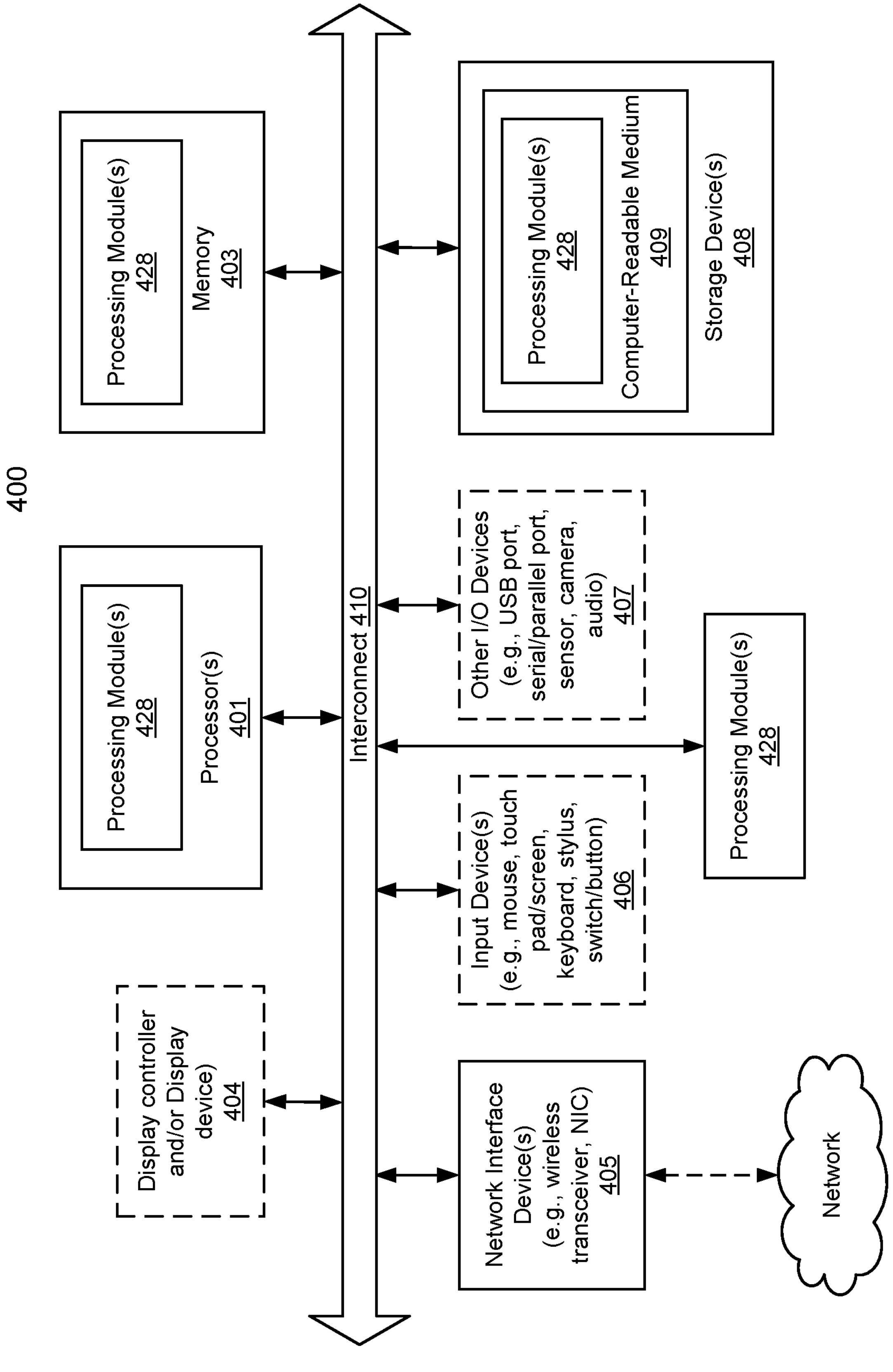
FIG. 4 shows a block diagram illustrating a data processing system in accordance with an embodiment.

Any of the components illustrated in FIGS. 1A-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a process performed by a host device, the method comprising:

obtaining, by a management controller of the host device, a screenshot of a graphical user interface displayed on a display of the host device, the screenshot being obtained while the host device is performing the process, the process being an installation of an operating system of the host device and only provides information regarding a progress of the process via the graphical user interface, the process only being locally manageable using hardware resources of the host device, the management controller being an independently operating computing device that is installed within and hosted by the host device, the host device being a data processing system, the management controller being operably connected to the hardware resources via a side band channel that is distinguishable from other channels to the hardware resources that facilitate performance of the process, and the management controller being operably connected to a remote management system that is remote to the data processing system via an out of band channel that bypasses the hardware resources;

initiating, by the management controller using the screenshot and while the hardware resources are unable to report an operating state of the hardware resources to the remote management system due to installation of the operating system being incomplete while the process is still ongoing, identification of whether the process is progressing as expected for an instance of the process using a decision model, wherein the data processing system further comprises only one network module, the only one network module being shared by both the hardware resources and the management controller and being separate from both the hardware resources and the management controller, and the only one network module is the only component installed within the data processing system that provides network access to other components installed within the data processing system; and in a first instance of the identification where the process is not progressing as expected:

performing, by the management controller, an action set to manage progression of the process in cooperation with the remote management system.

2. The method of claim 1, wherein the decision model is an inference model, the inference model being trained to generate inferences indicating an expected progression status of the process, the expected progression status indicating whether progression of the process is nominal, and a progress status of the process indicates how much of the process has been completed.

3. The method of claim 2, wherein initiating identification of whether the process is progressing comprises:

obtaining an inference for the process using:

the inference model; and the screenshot, wherein the inference indicates whether the process is progressing as expected for the instance of the process using the decision model.

4. The method of claim 3, wherein initiating identification of whether the process is progressing further comprises:

obtaining telemetry data for the hardware resources via the side band channel, the telemetry data comprising measurements of characteristics of the hardware resources while the host device is performing the process, and the characteristics of the hardware resources comprising health information and temperature information, wherein the inference is also obtained using the telemetry data.

5. The method of claim 4, wherein initiating identification of whether the process is progressing further comprises:

obtaining hardware data for the hardware resources, the hardware data specifying the hardware resources that are contributing to performance of the process, wherein the inference is also obtained using the hardware data.

6. The method of claim 5, wherein obtaining the inference comprises:

ingesting the screenshot, the telemetry data, and the hardware data into the inference model, the inference model generating the inference based on the screenshot, the telemetry data, and the hardware data.

7. The method of claim 1, further comprising:

identifying areas of interest in the screenshot;

segmenting the screenshot into segments to obtain screenshot segment; and classifying the screenshot segments based on the areas of interest in the screenshot to obtain screenshot segment classifications corresponding to the screenshot segments.

8. The method of claim 7, wherein each of the areas of interest in the screenshot define a group of pixels of the screenshot comprising informational content useable to infer the information regarding the progress of the process.

9. The method of claim 1, wherein performing the action set comprises:

obtaining, using the identification, management actions for the management controller, the management actions being actions performable by the management controller to modify operation of the hardware resources; and performing, by the management controller, the management actions.

10. The method of claim 1, further comprising:

in a second instance of the identification where the process is progressing as expected:

providing a message via the management controller to an external device indicating the progression of the process.

11. A non-transitory machine-readable medium having instructions stored therein, which when executed by a processor of a management controller, cause the processor to perform operations for managing a process performed by a host device that hosts the management controller, the operations comprising:

obtaining, by the management controller, a screenshot of a graphical user interface displayed on a display of the host device, the screenshot being obtained while the host device is performing the process, the screenshot being obtained while the host device is performing the process, the process being an installation of an operating system of the host device and only provides information regarding a progress of the process via the graphical user interface, the process only being manageable using hardware resources of the host device, the management controller being an independently operating computing device that is installed within and hosted by the host device, the host device being a data processing system, the management controller being operably connected to the hardware resources via a side band channel that is distinguishable from other channels to the hardware resources that facilitate performance of the process, and the management controller being operably connected to a remote management system that is remote to the data processing system via an out of band channel that bypasses the hardware resources;

initiating, by the management controller using the screenshot and while the hardware resources are unable to report an operating state of the hardware resources to the remote management system due to installation of the operating system being incomplete while the process is still ongoing, identification of whether the process is progressing as expected for an instance of the process using a decision model, wherein the data processing system further comprises only one network module, the only one network module being shared by both the hardware resources and the management controller and being separate from both the hardware resources and the management controller, and the only one network module is the only component installed within the data processing system that provides network access to other components installed within the data processing system; and in a first instance of the identification where the process is not progressing as expected:

performing, by the management controller, an action set to manage progression of the process in cooperation with the remote management system.

12. The non-transitory machine-readable medium of claim 11, wherein the decision model is an inference model, the inference model being trained to generate inferences indicating an expected progression status of the process, the expected progression status indicating whether progression of the process is nominal, and a progress status of the process indicates how much of the process has been completed.

13. The non-transitory machine-readable medium of claim 12, wherein initiating identification of whether the process is progressing comprises:

obtaining an inference for the process using:

the inference model; and the screenshot, wherein the inference indicates whether the process is progressing as expected for the instance of the process using the decision model.

14. The non-transitory machine-readable medium of claim 13, wherein initiating identification of whether the process is progressing further comprises:

obtaining telemetry data for the hardware resources, the telemetry data comprising measurements of characteristics of the hardware resources while the host device is performing the process, wherein the inference is also obtained using the telemetry data.

15. The non-transitory machine-readable medium of claim 14, wherein initiating identification of whether the process is progressing further comprises:

obtaining hardware data for the hardware resources, the hardware data specifying the hardware resources that are contributing to performance of the process, wherein the inference is also obtained using the hardware data.

16. A data processing system, comprising:

a first processor;

a first memory coupled to the first processor;

a management controller comprising a second processor coupled to second memory, the second memory storing instructions, which when executed by the second processor, cause the cause the second processor to perform operations for managing a process performed by the data processing system acting as a host device for the management controller, the operations comprising:

obtaining, by the management controller, a screenshot of a graphical user interface displayed on a display of the host device, the screenshot being obtained while the host device is performing the process, the process being an installation of an operating system of the data processing system and only provides information regarding a progress of the process via the graphical user interface, the process only being manageable using hardware resources of the host device, the management controller being an independently operating computing device that is installed within and hosted by the host device, the host device being a data processing system, the management controller being operably connected to the hardware resources via a side band channel that is distinguishable from other channels to the hardware resources that facilitate performance of the process, and the management controller being operably connected to a remote management system that is remote to the data processing system via an out of band channel that bypasses the hardware resources;

initiating, by the management controller using the screenshot and while the hardware resources are unable to report an operating state of the hardware resources to the remote management system due to installation of the operating system being incomplete while the process is still ongoing, identification of whether the process is progressing as expected for an instance of the process using a decision model, wherein the data processing system further comprises only one network module, the only one network module being shared by both the hardware resources and the management controller and being separate from both the hardware resources and the management controller, and the only one network module is the only component installed within the data processing system that provides network access to other components installed within the data processing system; and in a first instance of the identification where the process is not progressing as expected:

performing, by the management controller, an action set to manage progression of the process in cooperation with the remote management system.

17. The data processing system of claim 16, wherein the decision model is an inference model, the inference model being trained to generate inferences indicating an expected progression status of the process, the expected progression status indicating whether progression of the process is nominal, and a progress status of the process indicates how much of the process has been completed.

18. The data processing system of claim 17, wherein initiating identification of whether the process is progressing comprises:

obtaining an inference for the process using:

the inference model; and the screenshot, wherein the inference indicates whether the process is progressing as expected for the instance of the process using the decision model.

19. The data processing system of claim 16, wherein the only one network module of the data processing system comprises both wireless and wired network interfaces and is configured to direct network traffic of the management controller such that inbound network traffic directed to the management controller never flows through the hardware resources and outbound network traffic from the management controller never flows through the hardware resources.

20. The data processing system of claim 16, wherein an installer of the data processing system that is configured to install the operating system lacks management interfaces capable of reporting the operating state of the hardware resources to the remote management system while the installation of the operating system is still incomplete.

* * * * *